United States Patent
Spencer et al.

(10) Patent No.: US 11,168,155 B2
(45) Date of Patent: Nov. 9, 2021

(54) PHOSPHORAMIDATE CATALYSTS FOR ETHYLENE-BASED INTERPOLYMERS

(71) Applicant: Dow Global Technologies LLC, Midland, MI (US)

(72) Inventors: Liam P. Spencer, Lake Jackson, TX (US); David M. Pearson, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 155 days.

(21) Appl. No.: 16/488,063

(22) PCT Filed: Feb. 28, 2018

(86) PCT No.: PCT/US2018/020074
§ 371 (c)(1),
(2) Date: Aug. 22, 2019

(87) PCT Pub. No.: WO2018/160610
PCT Pub. Date: Sep. 7, 2018

(65) Prior Publication Data
US 2020/0010582 A1    Jan. 9, 2020

Related U.S. Application Data

(60) Provisional application No. 62/464,712, filed on Feb. 28, 2017.

(51) Int. Cl.
*C08F 4/649*    (2006.01)
*C08F 4/64*    (2006.01)
*C08F 4/659*    (2006.01)
*C08F 210/16*    (2006.01)

(52) U.S. Cl.
CPC ........ *C08F 4/6497* (2013.01); *C08F 4/64075* (2013.01); *C08F 4/65912* (2013.01); *C08F 210/16* (2013.01)

(58) Field of Classification Search
CPC ............... C08F 210/16; C08F 4/64055; C08F 4/64075; C08F 4/6497; C08F 4/65912; C08F 4/65908; C08F 4/659; C08F 210/14; C08F 2500/04; C08F 2500/02; Y02P 20/582

USPC ....................................................... 522/155
See application file for complete search history.

(56) References Cited

U.S. PATENT DOCUMENTS

| 6,268,448 | B1 | 7/2001 | Collins et al. |
| 6,670,432 | B1 | 12/2003 | Timmers |
| 8,202,953 | B2 | 6/2012 | Konze et al. |
| 2013/0131295 | A1 | 5/2013 | Giesbrecht |

OTHER PUBLICATIONS

Watson et al., "Zirconium Bis(Amido) Catalysts for Asymmetric Intramolecular Alkene Hydroamination", Drganometallics, 2006, p. 4731-4733.*
International Search Report and Written Opinion pertaining to PCT/US2018/020074, dated Jun. 12, 2018.
Watson et al., "Zirconium Bis(Amido) Catalysts for Asymmetric Intramolecular Alkene Hydroamination", Organometallics, 2006, 4731.

\* cited by examiner

*Primary Examiner* — William K Cheung
(74) *Attorney, Agent, or Firm* — Dinsmore & Shohl LLP

(57) ABSTRACT

Catalyst systems contain metal-ligand complexes according to formula (I): In formula (I), M is Ti, Zr, of Hf; n is 0, 1, 2, or 3; m is 1 or 2; each $R^1$ and each $R^2$ is independently chosen from $(C_1-C_{40})$hydrocarbyl, $(C_1-C_{40})$heterohydrocarbyl, $(C_1-C_{40})$aryl, $(C_1-C_{40})$heteroaryl, halogen, and —H; $R^1$ and $R^2$ are optionally covalently linked to each other; and each $R^3$ is a hydrocarbon or heterohydrocarbon radical having an identity depending on the value of subscript m. The metal-ligand complexes may be incorporated as procatalysts in catalyst systems for polyolefin polymerization.

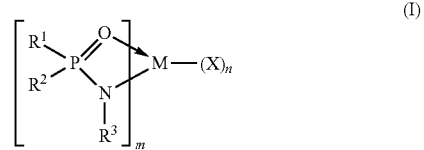

15 Claims, No Drawings

PHOSPHORAMIDATE CATALYSTS FOR ETHYLENE-BASED INTERPOLYMERS

CROSS REFERENCE TO RELATED APPLICATION

This application is a national stage application under 35 U.S.C. § 371 of PCT International Application Serial No. PCT/US2018/020074 filed 28 Feb. 2018, which claims the benefit of and priority to U.S. Provisional Patent Application Ser. No. 62/464,712 filed Feb. 28, 2017, which is incorporated by reference herein in its entirety.

TECHNICAL FIELD

Embodiments of the present disclosure generally relate to olefin polymerization catalyst systems and processes, and, more specifically, the synthesis of bi-aryl phenoxy group IV transition metal catalysts for olefin polymerization and to olefin polymerization processes incorporating the catalyst systems.

BACKGROUND

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and optionally one or more co-monomers are present in liquid diluents, such as an alkane or isoalkane, for example isobutane. Hydrogen may also be added to the reactor. The catalyst systems for producing polyethylene may typically comprise a chromium-based catalyst system, a Ziegler-Natta catalyst system, or a molecular (either metallocene or non-metallocene) catalyst system. The reactants in the diluent and the catalyst system are circulated at an elevated polymerization temperature around the loop reactor thereby producing polyethylene homopolymer or copolymer. Either periodically or continuously, part of the reaction mixture, including the polyethylene product dissolved in the diluent, together with unreacted ethylene and one or more optional co-monomers, is removed from the loop reactor. The reaction mixture when removed from the loop reactor may be processed to remove the polyethylene product from the diluent and the unreacted reactants, with the diluent and unreacted reactants typically being recycled back into the loop reactor. Alternatively, the reaction mixture may be sent to a second reactor, e.g. loop reactor, serially connected to the first loop reactor where a second polyethylene fraction may be produced.

Despite the research efforts in developing catalyst systems suitable for olefin polymerization, such as polyethylene or polypropylene polymerization, there is still a need for a pro-catalyst and a catalyst system exhibiting a higher efficiency than comparative catalyst systems, which are capable of producing polymer with high molecular weights and a narrow molecular weight distribution.

SUMMARY

According to some embodiments, a catalyst system includes a metal-ligand complex according to formula (I):

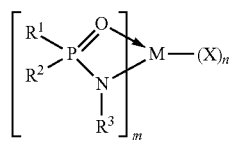

(I)

In formula (I), M is a metal chosen from titanium, zirconium, or hafnium, the metal being in a formal oxidation state of +2, +3, or +4. Subscript n is 0, 1, 2, or 3; and subscript m is 1 or 2. The metal-ligand complex has 6 or fewer metal-ligand bonds and is overall charge-neutral.

In formula (I), each $R^1$ and each $R^2$ is independently chosen from $(C_1-C_{40})$hydrocarbyl, $(C_1-C_{40})$heterohydrocarbyl, $(C_1-C_{40})$aryl, $(C_1-C_{40})$heteroaryl, halogen, and —H. $R^1$ and $R^2$ are optionally covalently linked to each other.

In formula (I), when m is 1, each X is a monodentate or bidentate ligand independently selected from the group consisting of $(C_1-C_{40})$hydrocarbyl, $(C_1-C_{40})$hydrocarbylene, $(C_6-C_{20})$aryl, $(C_5-C_{20})$heteroaryl, cyclopentadienyl, or a substituted cyclopentadienyl. $R^3$ is chosen from $(C_1-C_{40})$hydrocarbyl, $(C_5-C_{20})$heteroaryl, $(C_6-C_{40})$aryl, $(C_5-C_{40})$heteroaryl, unsubstituted $(C_1-C_{40})$alkyl, or a halogenated phenyl radical. $R^3$ is optionally covalently linked to $R^2$, provided that when any X is substituted or unsubstituted cyclopentadienyl, $R^3$ is selected from the group consisting of $(C_6-C_{40})$aryl substituted with at least one $R^S$ and $(C_5-C_{40})$heteroaryl substituted with at least one $R^S$, where $R^S$ is selected from the group consisting of $(C_1-C_{40})$hydrocarbyl and $(C_1-C_{40})$heterohydrocarbyl.

In formula (I), when m is 2, each X is a monodentate or bidentate ligand independently selected from the group consisting of $(C_1-C_{40})$hydrocarbyl, $(C_1-C_{40})$hydrocarbylene, $(C_6-C_{20})$aryl, $(C_5-C_{20})$heteroaryl, and a substituted or unsubstituted cyclopentadienyl, and each $R^3$ is independently chosen from $(C_1-C_{40})$hydrocarbyl, $(C_5-C_{20})$heteroaryl, $(C_6-C_{40})$aryl, $(C_5-C_{40})$heteroaryl, unsubstituted $(C_1-C_{40})$alkyl, or a halogenated phenyl radical, provided that when no X is a substituted or unsubstituted cyclopentadienyl, $R^3$ is selected from the group consisting of a $(C_6-C_{40})$ aryl substituted with at least one $R^S$ and a $(C_5-C_{40})$heteroaryl substituted with at least one $R^S$, where $R^S$ is selected from the group consisting of $(C_1-C_{40})$hydrocarbyl and $(C_1-C_{40})$heterohydrocarbyl.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpent-2-yl); Ts: toluene sulfonate; THF: tetrahydrofuran; Et$_2$O: diethyl ether; DMA: dimethylacetamide; DME: dimethoxyethane; CH$_2$C$_2$ or DCM: dichloromethane; CCl$_4$: carbon tetrachloride; EtOH: ethanol; CH$_3$CN: acetonitrile; MeCN: acetonitrile; THF: tetrahydrofuran; EtOAc: ethyl acetate; C$_6$D$_6$: deuterated benzene; Benzene-d6: deuterated benzene; CDCl$_3$: deuterated chloroform; DMSO-d6: deuterated dimethylsulfoxide; DBA: dibenzylideneacetone; $PPh_3$: triphenylphosphine; $PCy_3$: tricyclohexylphosphine; $NEt_3$: Triethylamine; $NH_2Pr$ Propylamine; $NaHSO_3$: sodium bisulfite; $SiO_2$: silica gel; $Me_4Si$: Tetramethylsilane; MeI: methyl iodide; NaOH: sodium hydroxide; $NaHCO_3$: sodium bicarbonate; NaOtBu: sodium tert-butoxide; $K_3PO_4$: potassium phosphate tribasic; brine: saturated aqueous sodium chloride; $Na_2SO_4$: sodium sulfate; $MgSO_4$: magnesium sulfate; HCl: hydrochloric acid; $NH_4OH$: ammonium hydroxide; KHMDS: potassium hexamethyldisilazide; $PCl_5$: phosphorous pentachloride; $SOCl_2$: Thionylchloride; n-BuLi: n-butyllithium; $AlMe_3$: trimethylaluminum; CuI: copper(I) iodide; $Cs_2CO_3$: cesium carbonate; $AgNO_3$: silver nitrate; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $NiBr_2(DME)$: nickel(II) bromide ethylene glycol dimethyl ether complex; $N_2$: nitrogen gas; PhMe: toluene; MAO: methylaluminoxane; MMAO: modified methylaluminoxane; PTFE: polytetrafluoroethylene; GC: gas chromatography; LC: liquid chromatography; NMR: nuclear magnetic resonance; HRMS: high resolution mass spectrometry; mmol: millimoles; g/mol: gram per mole; mL: milliliters; M: molar; min: minutes; h: hours; d: days.

The term "independently selected" indicates that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^1$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl (—$C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (having three carbons or more, and including monocyclic and polycyclic, fused and non-fused polycyclic, and bicyclic) or acyclic, and substituted by one or more $R^S$ or unsubstituted.

In this disclosure, a $(C_1-C_{40})$hydrocarbyl may be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$).

The terms "$(C_1-C_{40})$alkyl" and "$(C_1-C_{18})$alkyl" mean a saturated straight or branched hydrocarbon radical of from 1 to 40 carbon atoms and a saturated straight or branched hydrocarbon radical of from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and [$C_{45}$]alkyl. The term "[$C_{45}$]alkyl" means there is a maximum of 45 carbon atoms in the radical, including substituents, and is for example a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{40})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl: hexahydroindacenyl: indenyl: dihydroindenyl; naphthyl: tetrahydronaphthyl; and phenanthrene. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_3-C_{12})$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{20})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6-C_{40})$arylene α,ω-diradicals include phenyl-1,4-diyl napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{40})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)CH$_3$, in which "C*" denotes a carbon atom from which a hydrogen atom is removed to form a secondary or tertiary alkyl radical. Examples of substituted $(C_1-C_{40})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal 1,20-eicosylene). Since as mentioned previously two $R^S$ may be taken together to form a $(C_1-C_{18})$alkylene, examples of substituted $(C_1-C_{40})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo [2.2.2] octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$. Si(R$^C$)$_2$. P(R$^P$), N(R$^N$), —N=C(R$^C$)$_2$, —Ge(R$^C$)$_2$-, or —Si (R$^C$)—, where each R$^C$ and each R$^P$ is unsubstituted $(C_1-C_{18})$hydrocarbyl or —H, and where each R$^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{40})$heterohydrocarbyl" means a heterohydrocarbon radical of from 1 to 40 carbon atoms, and the term "$(C_1-C_{40})$heterohydrocarbylene" means a heterohydrocarbon diradical of from 1 to 40 carbon atoms. The heterohydrocarbon of the $(C_1-C_{40})$heterohydrocarbyl or the $(C_1-C_{40})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the ofther radical on a different heteroatom. Each $(C_1-C_{40})$heterohydrocarbyl and $(C_1-C_{40})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted. Non-limiting examples of the $(C_1-C_{40})$heterohydrocarbyl include $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si(R$^C$)$_2$-, $(C_1-C_{40})$hydrocarbyl-N(R$^N$)—, $(C_1-C_{40})$hydrocarbyl-P(R$^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) monocyclic, bicyclic, or tricyclic heteroaromatic hydrocarbon radical of from 4 to 40 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, or 3; and each heteroatom may be O, S, N, or P.

Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The κ-membered ring monocyclic heteroaromatic hydrocarbon radical has 6 minus h carbon atoms, where h is the number of heteroatoms and may be 1 or 2 and the heteroatoms may be N or P.

Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,5,6- ring system is 9H-carbazol-9-yl. An example of the fused 6,6,6-ring system is acrydin-9-yl.

The term $(C_1-C_{40})$heteroalkyl means a saturated straight or branched chain radical containing one to forty carbon atoms and one or more heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, $S(O)$, and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure include catalyst systems that include a metal-ligand complex according to formula (I):

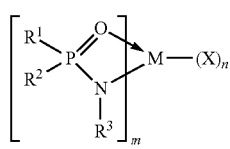

(I)

In formula (I), M is a metal chosen from titanium, zirconium, or hafnium, the metal being in a formal oxidation state of +2, +3, or +4; n is 0, 1, 2, or 3; m is 1 or 2; and the metal-ligand complex has 6 or fewer metal-ligand bonds and is overall charge-neutral. Each $R^1$ and each $R^2$ is independently chosen from $(C_1-C_{40})$hydrocarbyl, $(C_1-C_{40})$heterohydrocarbyl, $(C_1-C_{40})$aryl, $(C_1-C_{40})$heteroaryl, halogen, and —H, and $R^1$ and $R^2$ are optionally covalently linked to each other. When $R^1$ and $R^2$ are covalently linked to each other, at least one phosphorus containing ring structure may be formed from portions of $R^1$ and $R^2$.

In embodiments, any one or each of the chemical groups (e.g., X, R, etc.) of the metal-ligand complex of formula (I) may be unsubstituted or may be substituted with at least one substituent $R^S$. In some embodiments, at least one of the chemical groups of the metal-ligand complex of formula (I) independently contain one or more substituents $R^S$.

In embodiments, the catalyst system may include a metal-ligand complex according to formula (I), in which m is 1 and each X is a monodentate or bidentate ligand independently selected from the group consisting of $(C_1-C_{40})$hydrocarbyl, $(C_1-C_{40})$hydrocarbylene, $(C_6-C_{20})$aryl, $(C_5-C_{20})$heteroaryl, cyclopentadienyl, and a substituted cyclopentadienyl. In such embodiments, when no X is a substituted or unsubstituted cyclopentadienyl, $R^3$ is chosen from $(C_1-C_{40})$hydrocarbyl, $(C_5-C_{20})$heteroaryl, $(C_6-C_{40})$aryl, $(C_5-C_{40})$heteroaryl, unsubstituted $(C_1-C_{40})$alkyl, or a halogenated phenyl radical and is optionally covalently linked to $R^2$. Also in such embodiments, when any X is a substituted or unsubstituted cyclopentadienyl, $R^3$ is selected from the group consisting of a $(C_6-C_{40})$aryl substituted with at least one $R^S$ and a $(C_5-C_{40})$heteroaryl substituted with at least one $R^S$, where $R^S$ is selected from the group consisting of $(C_1-C_{40})$hydrocarbyl and $(C_1-C_{40})$heterohydrocarbyl.

In further embodiments, the catalyst system may include a metal-ligand complex according to formula (I), in which m is 1 and $R^1$ and $R^2$ are a $(C_6-C_{40})$aryl such as phenyl, for example. In such embodiments, $R^3$ may be a phenyl group substituted with at least one group $R^S$ that is selected from the group consisting of $(C_1-C_{40})$hydrocarbyl and $(C_1-C_{40})$heterohydrocarbyl; or $R^3$ may be a phenyl group substituted with two or more $R^S$, where each $R^S$ is independently $(C_1-C_{40})$hydrocarbyl. In illustrative embodiments, $R^1$ and $R^2$ may be a $(C_6-C_{40})$aryl such as phenyl, and the $(C_6-C_{40})$aryl may be substituted with one or more groups $R^S$ such as 1-methylethyl, for example.

In other embodiments, the catalyst system may include a metal-ligand complex according to formula (I), in which m is 2 and each X is a monodentate or bidentate ligand independently selected from the group consisting of $(C_1-C_{40})$hydrocarbyl, $(C_1-C_{40})$hydrocarbylene, $(C_6-C_{20})$aryl, $(C_5-C_{20})$heteroaryl, and a substituted or unsubstituted cyclopentadienyl. In such embodiments, when any X is a substituted or unsubstituted cyclopentadienyl, each $R^3$ is independently chosen from $(C_1-C_{40})$hydrocarbyl, $(C_5-C_{20})$heteroaryl, $(C_6-C_{40})$aryl, $(C_5-C_{40})$heteroaryl, unsubstituted $(C_1-C_{40})$alkyl, or a halogenated phenyl radical. Also in such embodiments, when no X is a substituted or unsubstituted cyclopentadienyl, $R^3$ is selected from the group consisting of a $(C_6-C_{40})$aryl substituted with at least one $R^S$ and a $(C_5-C_{40})$heteroaryl substituted with at least one $R^S$, where $R^S$ is selected from the group consisting of $(C_1-C_{40})$hydrocarbyl and $(C_1-C_{40})$heterohydrocarbyl.

When m is 2 in the metal-ligand complex of formula (I), the metal-ligand complex has a structure according to formula (II):

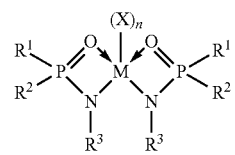

(II)

where $R^1$, $R^2$, $R^3$, and X are as defined in formula (I); and n is 0, 1 or 2. It should be readily understood that all metal-ligand complexes according to formula (II) are also complexes according to formula (I). Therefore, embodiments described with respect to metal-ligand complexes according to formula (II) necessarily apply to complexes according to formula (I).

In other embodiments, the catalyst system may include a metal-ligand complex according to formula (II), in which each $R^1$ and each $R^2$ is phenyl. In such embodiments, $R^3$ may be a phenyl group substituted with at least one group $R^S$, where $R^S$ is selected from the group consisting of $(C_1-C_{40})$hydrocarbyl and $(C_1-C_{40})$heterohydrocarbyl; or each $R^3$ may be a phenyl group substituted with two groups $R^S$, where each group $R^S$ is independently $(C_1-C_{40})$hydrocarbyl. In further embodiments, each $R^S$ is 1-methylethyl.

The M in the metal-ligand complex of formula (I) may include transition metals, such as titanium (Ti), zirconium (Zr), or hafnium (Hf), the metal being in a formal oxidation state of +2, +3, or +4. The subscript n of (X), of formula (I) is 1, 2, or 3. The subscript n is chosen in view of the identities of the 1, 2, or 3 ligands X, such that the metal-ligand complex has 6 or fewer metal-ligand bonds and is overall charge-neutral.

The metal M in the metal-ligand complex of formulas (I) and (II) may be derived from a metal precursor that is subsequently subjected to a single-step or multi-step synthesis to prepare the metal-ligand complex. Suitable metal precursors may be monomeric (one metal center) or dimeric (two metal centers), or may have a plurality of metal centers greater than two, such as 3, 4, 5, or more than 5 metal centers. Specific examples of suitable hafnium and zirconium precursors include, but are not limited to $HfCl_4$, $HfMe_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$; $ZrCl_4$, $ZrMe_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, and $Zr(N(SiMe_3)_2)_2Cl_2$, $TiMe_4$, $TiBn_4$, $TiCl_4$ and $Ti(CH_2Ph)_4$. Lewis base adducts of these examples are also suitable as metal precursors, for example, ethers, amines, thioethers, and phosphines are suitable as Lewis bases. Specific examples include $HfCl_4(THF)_2$, $HfCl_4(SMe_2)_2$ and $Hf(CH_2Ph)_2Cl_2(OEt_2)$. Activated metal precursors may be ionic or zwitterionic compounds, such as $(M(CH_2Ph)_3^+)(B(C_6F_5)_4^-)$ or $(M(CH_2Ph)_3^+)$ $(PhCH_2B(C_6F_5)_3^-)$ where M is defined above as being Hf or Zr.

In the metal-ligand complex according to formula (I), each X bonds with M through a covalent bond, dative bond, or ionic bond. When n is 1, X may be a monodentate ligand or a bidentate ligand; when n is 2, each X is an independently chosen monodentate ligand and may be the same as or different from other groups X; the metal-ligand complex is overall charge-neutral. In some embodiments, the monodentate ligand may be a monoanionic ligand. Monoanionic ligands have a net formal oxidation state of −1. Each monoanionic ligand may independently be hydride, $(C_1-C_{40})$hydrocarbyl carbanion. $(C_1-C_{40})$heterohydrocarbyl carbanion, halide, nitrate, carbonate, phosphate, sulfate. $HC(O)O^-$, $HC(O)N(H)^-$. $(C_1-C_{40})$hydrocarbylC(O)O$^-$, $(C_1-C_{40})$hydrocarbylC(O)N$((C_1-C_{20})$hydrocarbyl$)^-$. $(C_1-C_{40})$hydrocarbylC(O)N(H)$^-$, $R^KR^L B^-$, $R^KR^L N^-$. $R^KO^-$, $R^KS^-$, $R^KR^LP^-$, or $R^MR^KR^LSi^-$, wherein each $R^K$, $R^L$, and $R^M$ independently is hydrogen. $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In other embodiments, at least one monodentate ligand X of the metal-ligand complex may be a neutral ligand. In specific embodiments, the neutral ligand is a neutral Lewis base group such as $R^XNR^KR^L$, $R^KOR^L$, $R^KSR^L$, or $R^XPR^KR^L$, where each $R^X$ independently is hydrogen, [$(C_1-C_{10})$hydrocarbyl]$_3$Si$(C_1-C_{10})$hydrocarbyl, $(C_1-C_{40})$hydrocarbyl, [$(C_1-C_{10})$hydrocarbyl]$_3$Si, or $(C_1-C_{40})$heterohydrocarbyl and each $R^K$ and $R^L$ independently is as defined above.

Additionally, each X of the metal-ligand complex may be a monodentate ligand that independently chosen from halogen, unsubstituted $(C_1-C_{20})$hydrocarbyl, unsubstituted $(C_1-C_{20})$hydrocarbylC(O)O—, or $R^KR^LN$—, where each of $R^K$ and $R^L$ independently is an unsubstituted $(C_1-C_{20})$hydrocarbyl. In some embodiments, each monodentate ligand X of the metal-ligand complex is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$—, where each of $R^K$ and $R^L$ independently is an unsubstituted $(C_1-C_{10})$hydrocarbyl.

In some embodiments, the catalyst system may include a metal-ligand complex according to either of formula (I) or formula (II) in which n is 2 or greater than 2, such that there are at least two groups X, and in which any two groups X may be joined to form a bidentate ligand. In illustrative embodiments including a bidentate ligand, the bidentate ligand may be a neutral bidentate ligand. In one embodiment, the neutral bidentate ligand is a diene of formula $(R^D)_2C=C(R^D)C(R^D)=C(R^D)_2$, wherein each $R^D$ is independently H, unsubstituted $(C_1-C_6)$alkyl, phenyl, or naphthyl. In some embodiments the bidentate ligand is a monoanionic-mono (Lewis base) ligand. In some embodiments, the bidentate ligand is a dianionic ligand. The dianionic ligand has a net formal oxidation state of −2. In one embodiment, each dianionic ligand independently is carbonate, oxalate (i.e., $^-O_2CC(O)O^-$), $(C_2-C_{40})$hydrocarbylene dicarbanion, $(C_1-C_{40})$heterohydrocarbylene dicarbanion, phosphate, or sulfate.

In further embodiments, X is selected from methyl; ethyl; 1-propyl; 2-propyl; 1-butyl; 2,2-dimethylpropyl; trimethylsilylmethyl; phenyl; benzyl; chloro, methoxy and ethoxy. In some embodiments n is 2 and each X is the same. In some instances, at least two X are different from each other. In other embodiments n is 2 and each X is a different one of methyl; ethyl; 1-propyl; 2-propyl; 1-butyl; 2,2-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In illustrative embodiments, the catalyst systems may include a metal-ligand complex according to formula (I) having a structure of any Procatalysts 1-19:

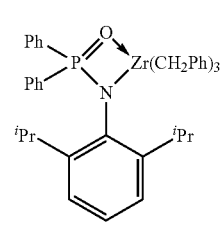

Procatalyst 1

-continued
Procatalyst 2
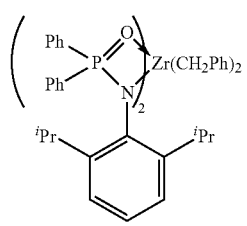
Procatalyst 3
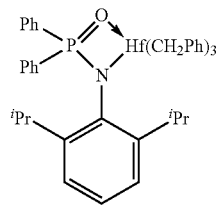
Procatalyst 4
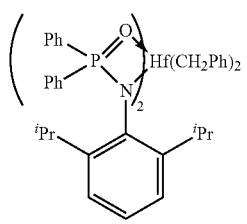
Procatalyst 5
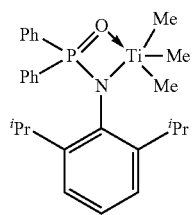
Procatalyst 6
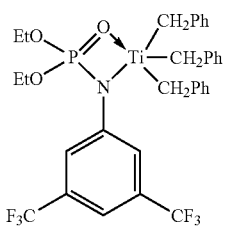
Procatalyst 7
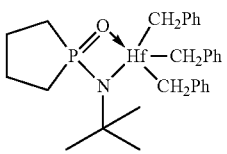
Procatalyst 8
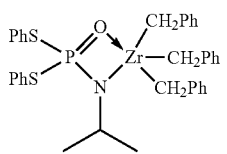
Procatalyst 9
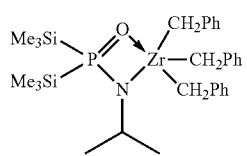
-continued
Procatalyst 10
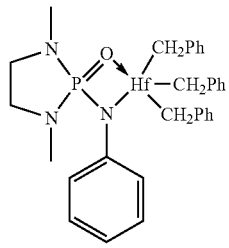
Procatalyst 11
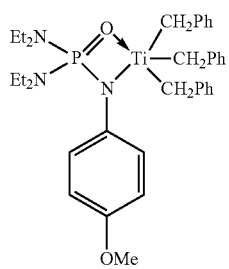
Procatalyst 12
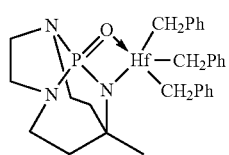
Procatalyst 13
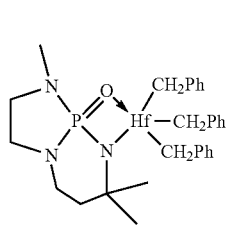
Procatalyst 14
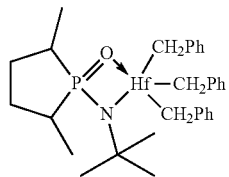
Procatalyst 15
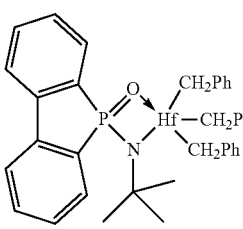
Procatalyst 16
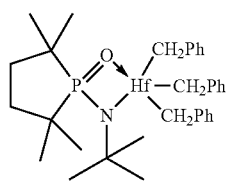

-continued
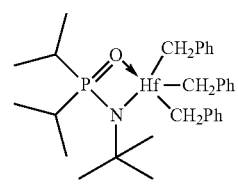
Procatalyst 17
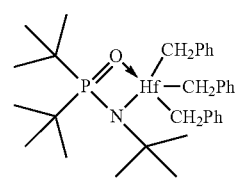
Procatalyst 18
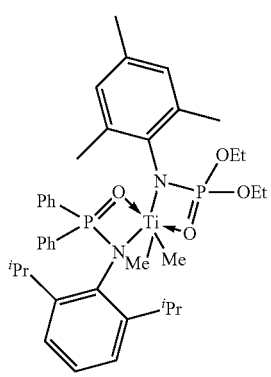
Procatalyst 19
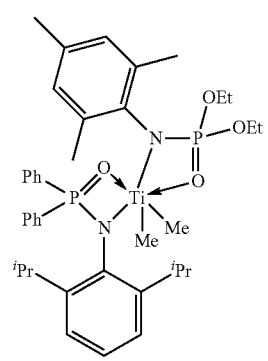
Procatalyst 20
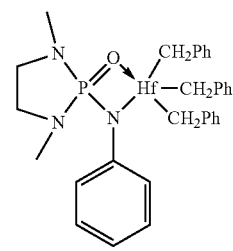
Procatalyst 21
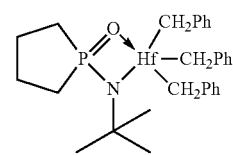
Procatalyst 22
-continued
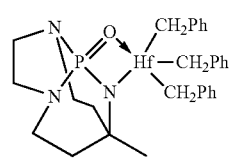
Procatalyst 23
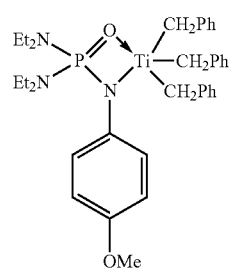
Procatalyst 24
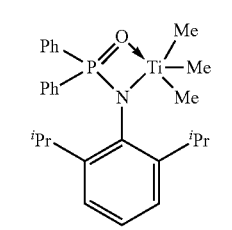
Procatalyst 25
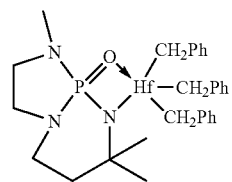
Procatalyst 26
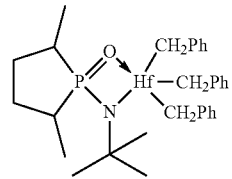
Procatalyst 27
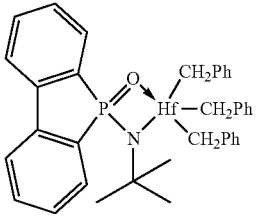
Procatalyst 28
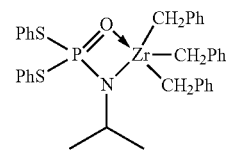
Procatalyst 29
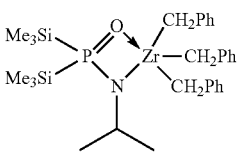
Procatalyst 30

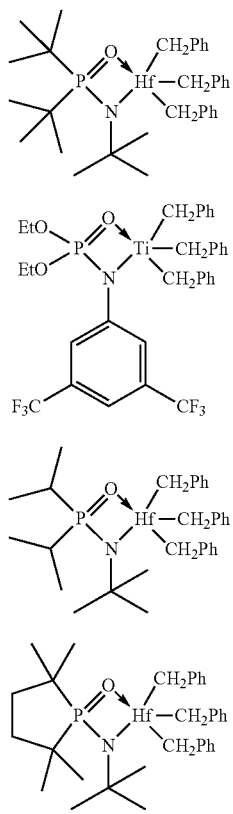

Procatalyst 31

Procatalyst 32

Procatalyst 33

Procatalyst 34

Cocatalyst Component

The catalyst system comprising a metal-ligand complex of formula (I) may be rendered catalytically active by contacting it to, or combining it with, an activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2{}^+$, ($C_1$-$C_{20}$)hydrocarbyl)$_4$N(H)$_3{}^+$, or N(H)$_4{}^+$, wherein each ($C_1$-$C_{20}$)hydrocarbyl, when two or more are present, may be the same or different.

Combinations of neutral Lewis acid activating co-catalysts include mixtures comprising a combination of a tri (($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system comprising the metal-ligand complex of formula (I) may be activated to form an active catalyst composition by combining the metal-ligand complex of formula (I) with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis (pentafluorophenyl)borate(1-) amine, and combinations thereof.

In some embodiments, more than one of the foregoing activating co-catalysts may be used in combination with each other. An especially preferred combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs may be utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise at least 50 percent by weight of units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 percent by weight of units derived from ethylene; at least 70 percent by weight of units derived from ethylene; at least 80 percent by weight of units derived from ethylene; or from 50 to 100 percent by weight of units derived from ethylene; or from 80 to 100 percent by weight of units derived from ethylene.

In some embodiments, the ethylene based polymers may comprise at least 90 percent by moles of units derived from ethylene. All individual values and subranges from at least 90 mole percent are included herein and disclosed herein as separate embodiments. For example, the ethylene based polymers may comprise at least 93 percent by moles of units derived from ethylene; at least 96 percent by moles of units; at least 97 percent by moles of units derived from ethylene; or in the alternative, from 90 to 100 percent by moles of units derived from ethylene; from 90 to 99.5 by moles of units derived from ethylene; or from 97 to 99.5 percent by moles of units derived from ethylene.

In some embodiments of the ethylene based polymer, the amount of additional α-olefin is less than 50%; other embodiments include at least 1 mole percent (mol %) to 20 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further compromise fillers, which may include, but are not limited to, organic or inorganic fillers. Such fillers, e.g. calcium carbonate, talc, $Mg(OH)_2$, can be present in levels from about 0 to about 20 weight percent, based on the weight of the ethylene based polymers and the one or more additives, fillers, or both. The ethylene based polymers may further be blended with one or more polymers to form a blend.

Embodiments of the catalyst system described in this disclosure yield unique polymer properties as a result of the high molecular weights of the polymers formed and the amount of the co-monomers incorporated.

EXAMPLES

Example 1: Synthesis of N-(2,6-diisopropylphenyl)-P,P-diphenylphosphinic amide

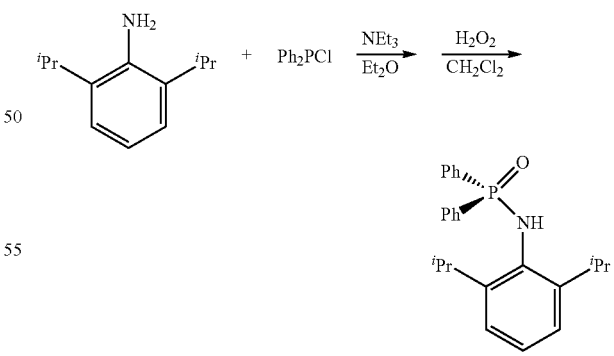

To a stirring diethyl ether solution (50 mL) of 2,6-diisopropylaniline (4.00 g, 22.6 mmol) was added a slight excess of triethylamine (2.1 g, 21 mmol) under an $N_2$ atmosphere. While the solution was stirring, a diethyl ether solution of $Ph_2PCl$ (4.52 g, 20.5 mmol) was added dropwise and the solution stirred overnight. The suspension was filtered and the precipitate further washed with 2 aliquots of diethyl ether (50 mL total). The solvent was removed by reduced pressure and dissolved in 50 mL $CH_2Cl_2$. The solution was cooled to −35° C. and an aqueous solution of $H_2O_2$(30%, 1.39 g) added dropwise. The solution was allowed to warm to room temperature and stirred for 1 hour. The solvent was removed by reduced pressure and the residue triturated with 50 mL diethyl ether. The solid was collected and further washed with diethyl ether to provide the product in near quantitative yield.

$^1$H NMR (CDCl$_3$): 1.04 (d, J=8 Hz, 12H), 3.59 (sept, J=8 Hz, 2H), 4.43 (d, J=Hz, 1H), 7.05 (m, 2H), 7.17 (m, 1H), 7.42 (m, 4H), 7.49 (m, 2H), 7.73 (m, 4H). $^{13}$C NMR (CDCl$_3$): 23.7, 28.4, 123.5 (d), 127.3 (d), 128.3 (d), 131.4, 131.8 (d), 131.9 (d), 132.7, 147.5 (d). $^{31}$P NMR (CDCl$_3$): 21.6 (s)

Example 2: Synthesis of Procatalyst 1

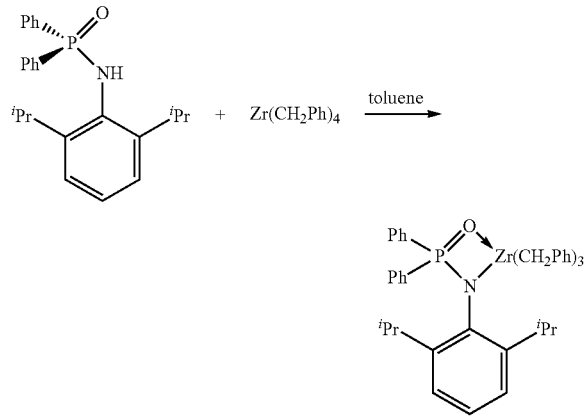

To a stirring toluene (5 mL) solution of Zr(CH$_2$Ph)$_4$ (241 mg, 0.53 mmol) was added a toluene suspension of N-(2,6-diisopropylphenyl)-P,P-diphenylphosphinic amide (200 mg, 0.53 mmol). The clear solution was stirred overnight at room temperature. The solvent was then removed by reduced pressure and the residue triturated with 5 mL hexanes. The solid product was collected by filtration and further dried to give the product in near quantitative yield.

$^1$H NMR (C$_6$D$_6$): 0.60 (br s, 6H), 1.28 (br s, 6H), 2.37 (s, 4H), 3.44 (sept, J=8 Hz, 2H), 6.88 (m, 4H), 6.93-7.02 (m, 11H), 7.12-7.19 (m, 9H), 7.27 (m, 4H). $^{31}$P NMR (C$_6$D$_6$): 41.4 (s).

Example 3: Synthesis of Procatalyst 2

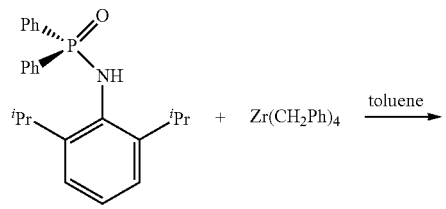

-continued

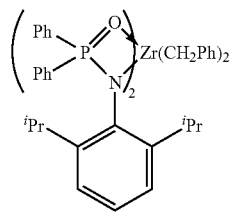

To a stirring toluene (5 mL) solution of Zr(CH$_2$Ph)$_4$ (181 mg, 0.40 mmol) was added a toluene suspension of N-(2,6-diisopropylphenyl)-P,P-diphenylphosphinic amide (300 mg, 0.79 mmol). The clear solution was stirred overnight at room temperature. The solvent was then removed by reduced pressure and the residue triturated with 5 mL hexanes. The solid product was collected by filtration and further dried to give the product in near quantitative yield.

$^1$H NMR (C$_6$D$_6$): 1.01 (br s, 24H), 3.02 (br s, 4H), 3.57 (br s, 4H), 6.85-7.05 (m, 19H), 7.14 (m, 7H), 7.45 (m, 10H). $^{31}$P NMR (C$_6$D$_6$): 39.2 (s).

Example 4: Synthesis of Procatalyst 3

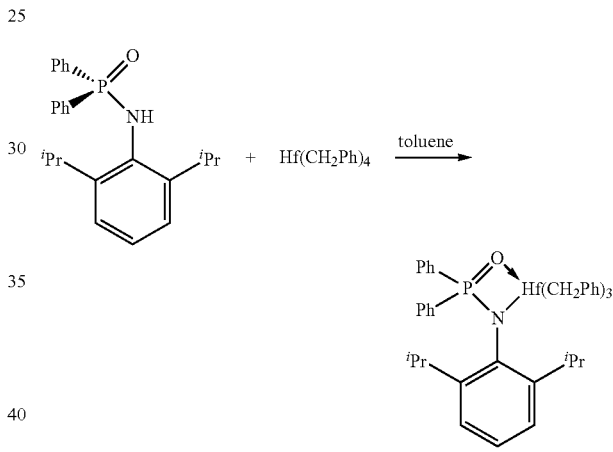

To a stirring toluene (5 mL) solution of Hf(CH$_2$Ph)$_4$ (489 mg, 0.90 mmol) was added a toluene suspension of N-(2,6-diisopropylphenyl)-P,P-diphenylphosphinic amide (340 mg, 0.90 mmol). The clear solution was stirred overnight at room temperature. The solvent was then removed by reduced pressure and the residue triturated with 5 mL hexanes. The solid product was collected by filtration and further dried to give the product in near quantitative yield.

$^1$H NMR (C$_6$D$_6$): 0.49 (br s, 6H), 1.32 (br s, 6H), 2.22 (s, 4H), 3.32 (sept, J=8 Hz, 2H), 6.85 (m, 4H), 6.94 (m, 6H), 7.09 (m, 8H), 7.24 (m, 10H). $^{31}$P NMR (C$_6$D$_6$): 39.2 (s).

Example 5: Synthesis of Procatalyst 4

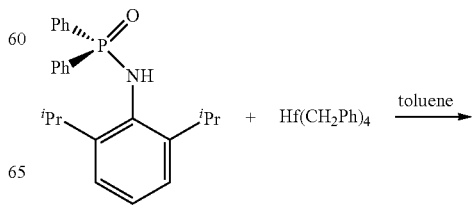

-continued

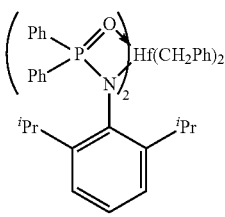

To a stirring toluene (5 mL) solution of Hf(CH$_2$Ph)$_4$ (252 mg, 0.46 mmol) was added a toluene suspension of N-(2,6-diisopropylphenyl)-P,P-diphenylphosphinic amide (350 mg, 0.92 mmol). The clear solution was stirred overnight at room temperature. The solvent was then removed by reduced pressure and the residue triturated with 5 mL hexanes. The solid product was collected by filtration and further dried to give the product in near quantitative yield.

$^1$H NMR (C$_6$D$_6$): 1.00 (br s, 24H), 2.65 (br s, 4H), 3.64 (br s, 4H), 6.84 (m, 2H), 6.95 (m, 13H), 7.20 (m, 11H), 7.31 (m, 4H), 7.56 (m, 8H). $^{31}$P NMR (C$_6$D$_6$): 38.7 (s).

Procedure for Batch Reactor Polymerization

Raw materials (ethylene, 1-octene) and the process solvent (a narrow boiling range high-purity isoparaffinic solvent trademarked ISOPAR E commercially available from ExxonMobil Corporation) were purified with molecular sieves before introduction into the reaction environment. A one-gallon (3.79 L) stirred autoclave reactor was charged with ISOPAR E, and 1-octene. The reactor was then heated to the 120° C. and charged with ethylene to bring the total pressure to about 420 psig. The catalyst composition was prepared in a drybox under inert atmosphere by mixing the desired metal-ligand complex (prepared as previously described) and a co-catalyst ([HNMe(C$_{18}$H$_{37}$)$_2$][B(C$_6$F$_5$)$_4$]) along with modified methylaluminoxane (MMAO), with additional solvent to give a total volume of about 15-20 mL. The activated catalyst mixture was then quick-injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs.

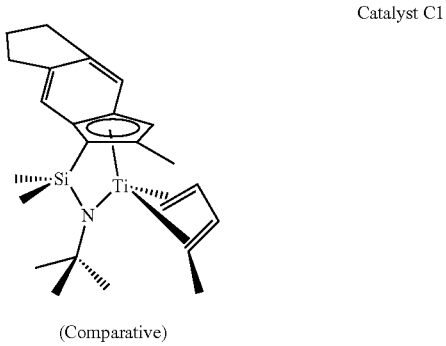

Catalyst C1
(Comparative)

Catalytic efficiency and resulting polymer characteristics were assessed for Catalysts 1-4, each having a structure according to formula (I). The polymerizations were carried out in a Batch Reactor.

The data in Table 1 were obtained at 120° C. polymerization temperature. The quench times indicate the time required to reach 50 psi ethylene uptake. The polymerizations were quenched with CO, either at the time of reaching the target uptake or after 1800 seconds, which ever occurred first.

TABLE 1

Batch Reactor Ethylene/Octene Data

| Procatalyst | Yield (g) | Efficiency* (g poly/ g of metal) | Mn | M$_w$ (g/mol) | Mn/ M$_w$ | T$_m$ |
|---|---|---|---|---|---|---|
| Procatalyst 1 | 30 | 43,848 | 475 | 14,778 | 31.12 | 113.4 |
| Procatalyst 2 | 26 | 114,005 | 493 | 19,640 | 39.84 | 113.5 |
| Procatalyst 3 | 16 | 11,952 | 67,212 | 427,197 | 6.36 | 89.4 |
| Procatalyst 4 | 22 | 24,651 | 46,572 | 458,791 | 9.85 | 88.9 |
| Catalyst C1 (Comparative) | 39 | 2,036,341 | 26,821 | 74,858 | 2.79 | 74.0 |

*Efficiency is defined in units of 10$^6$ grams polymer per gram of active metal (Hf or Zr).

The Procatalysts 1-2 provided polymers having molecular weights less than that of the polymer from comparative catalyst. Specifically, the Procatalysts 1-2 yielded polymers with molecular weights less than 20,000 g/mol, while the comparative catalyst yielded a polymer having a molecular weight of 74,858 g/mol. One the other hand, Procatalysts 3-4 yielded polymers with substantially greater molecular weights, both being at least 350,000 g/mol greater than that of the polymer from the comparative catalyst.

Measurement Standards

Density

Samples that are measured for density are prepared according to ASTM D-1928, which is incorporated herein by reference in its entirety. Measurements are made within one hour of sample pressing using ASTM D-792, Method B, which is incorporated herein by reference in its entirety.

Melt Index

Melt index (I$_2$) is measured in accordance with ASTM-D 1238, which is incorporated herein by reference in its entirety, Condition 190° C./2.16 kg, and is reported in grams eluted per 10 minutes. Melt flow rate (I$_{10}$) is measured in accordance with ASTM-D 1238, Condition 190° C./10 kg, and is reported in grams eluted per 10 minutes.

Octene Content

The mole % (mol %) of 1-octene within each sample was determined by taking a ratio of the CH$_3$ area (1382.7-1373.5 wavenumbers) to the CH$_2$ area (1525-1400 wavenumbers) and normalizing to a standard curve generated through NMR analysis of ethylene-co-1-octene polymer standards.

Crystallization Elution Fraction

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/mL (unless otherwise specified). The injection volume is 300 μL. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 mL/min. The flow rate during elution is at 0.50 mL/min. The data are collected at one data point/second.

The CEF column is packed by the Dow Chemical Company with glass beads at 125 μm±6% (MO-SCI Specialty Products) with 0.125-inch (0.3175-cm) stainless tubing.

Glass beads are acid washed by MO-SCI Specialty with the request from the Dow Chemical Company. Column volume is 2.06 mL. Column temperature calibration is performed by using a mixture of NIST Standard Reference Material Linear polyethylene 1475a (1.0 mg/mL) and Eicosane (2 mg/mL) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/mL).

Gel Permeation Chromatography (GPC)

The ethylene/alpha-olefin interpolymers were tested for their properties via GPC, according to the following procedure. The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes.

Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours (4 h). The injection volume is 200 microliters (μL). The flow rate through the GPC is set at 1 mL/minute.

Measurement for Efficiency

The catalytic efficiency is measured in terms of amount of polymer produced relative to the amount catalyst used in solution polymerization process, wherein the polymerization temperature is at least 130° C.

The GPC column set is calibrated before running the Examples by running twenty-one narrow molecular weight distribution polystyrene standards. The molecular weight (Mw) of the standards ranges from 580 to 8,400,000 grams per mole (g/mol), and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 g/mol and 0.05 g in 50 mL of solvent for molecular weights less than 1,000,000 g/mol. The polystyrene standards were dissolved at 80° C. with gentle agitation for 30 minutes. The narrow standards mixtures are run first and in order of decreasing highest molecular weight (Mw) component to minimize degradation. The polystyrene standard peak molecular weights are converted to polyethylene Mw using the Mark-Houwink constants. Upon obtaining the constants, the two values are used to construct two linear reference conventional calibrations for polyethylene molecular weight and polyethylene intrinsic viscosity as a function of elution column It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A catalyst system comprising a metal-ligand complex according to formula (I):

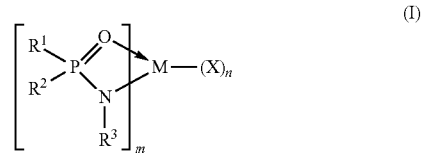

where:

M is titanium, zirconium, or hafnium, the metal being in a formal oxidation state of +2, +3, or +4;

n is 0, 1, 2, or 3;

m is 1 or 2;

the metal-ligand complex has 6 or fewer metal-ligand bonds and is overall charge-neutral;

each $R^1$ and each $R^2$ is independently selected from group consisting of $(C_1-C_{40})$hydrocarbyl, $(C_1-C_{40})$heterohydrocarbyl, $(C_1-C_{40})$aryl, $(C_1-C_{40})$heteroaryl, halogen, and —H, and $R^1$ and $R^2$ are optionally covalently linked to each other;

when m is 1, each X is a monodentate or bidentate ligand independently selected from the group consisting of $(C_1-C_{40})$hydrocarbyl, $(C_1-C_{40})$hydrocarbylene, $(C_6-C_{20})$aryl, $(C_5-C_{20})$heteroaryl, cyclopentadienyl, and a substituted cyclopentadienyl, and $R^3$ is selected from $(C_1-C_{40})$hydrocarbyl, $(C_5-C_{20})$heteroaryl, $(C_6-C_{40})$aryl, $(C_5-C_{40})$heteroaryl, unsubstituted $(C_1-C_{40})$alkyl, and a halogenated phenyl radical and is optionally covalently linked to $R^2$, provided that when any X is substituted or unsubstituted cyclopentadienyl, $R^3$ is selected from the group consisting of $(C_6-C_{40})$aryl substituted with at least one $R^s$ and $(C_5-C_{40})$heteroaryl substituted with at least one $R^s$, where $R^s$ is selected from the group consisting of $(C_1-C_{40})$hydrocarbyl and $(C_1-C_{40})$heterohydrocarbyl; and;

when m is 2, each X is a monodentate or bidentate ligand independently selected from the group consisting of $(C_1-C_{40})$hydrocarbyl, $(C_1-C_{40})$hydrocarbylene, $(C_6-$ $C_{20}$)aryl, ($C_5$-$C_{20}$)heteroaryl, and a substituted or unsubstituted cyclopentadienyl, and each $R^3$ is independently selected from ($C_1$-$C_{40}$)hydrocarbyl, ($C_5$-$C_{20}$)heteroaryl, ($C_6$-$C_{40}$)aryl, ($C_5$-$C_{40}$)heteroaryl, unsubstituted ($C_1$-$C_{40}$)alkyl, and a halogenated phenyl radical, provided that when no X is a substituted or unsubstituted cyclopentadienyl, $R^3$ is selected from the group consisting of a ($C_6$-$C_{40}$)aryl substituted with at least one $R^s$ and a ($C_5$-$C_{40}$)heteroaryl substituted with at least one $R^s$, where $R^s$ is selected from the group consisting of ($C_1$-$C_{40}$)hydrocarbyl and ($C_1$-$C_{40}$)heterohydrocarbyl.

2. The catalyst system of claim 1, wherein $R^1$ and $R^2$ are ($C_6$-$C_{40}$)aryl.

3. The catalyst system of claim 1, wherein m is 1; and $R^1$ and $R^2$ are phenyl.

4. The catalyst system of claim 1, wherein m is 1; and $R^3$ is a phenyl group substituted with at least one group $R^s$ is selected from the group consisting of ($C_1$-$C_{40}$)hydrocarbyl and ($C_1$-$C_{40}$)heterohydrocarbyl.

5. The catalyst system of claim 1, wherein: m is 1; and $R^3$ is a phenyl group substituted with two groups $R^s$, and each $R^s$ is independently ($C_1$-$C_{40}$)hydrocarbyl.

6. The catalyst system according to claim 5, wherein: m is 1; and $R^s$ is 1-methylethyl.

7. The catalyst system of claim 1, wherein each X is benzyl.

8. The catalyst system of claim 1, wherein m is 2, whereby the metal-ligand complex has a structure according to formula (II):

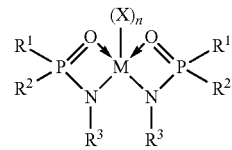

where $R^1$, $R^2$, $R^3$, and X are as defined in formula (I); and where n is 0, 1 or 2.

9. The catalyst system of claim 8, wherein each $R^1$ is phenyl and each $R^2$ is phenyl.

10. The catalyst system of claim 8, wherein each $R^3$ is a phenyl group substituted with at least one group $R^s$, where $R^s$ is selected from the group consisting of ($C_1$-$C_{40}$)hydrocarbyl and ($C_1$-$C_{40}$)heterohydrocarbyl.

11. The catalyst system of claim 8, wherein each $R^3$ is a phenyl group substituted with two groups $R^s$; and each group $R^s$ is independently ($C_1$-$C_{40}$)hydrocarbyl.

12. The catalyst system according to claim 11, wherein each $R^s$ is 1-methylethyl.

13. The catalyst system of claim 8, wherein each X is benzyl.

14. A polymerization process for producing an ethylene-based polymer, the polymerization process comprising:
polymerizing ethylene and at least one additional α-olefin in the presence of a catalyst system according to claim 1.

15. The polymerization process according claim 14, wherein the catalyst system further comprises at least one additional cocatalyst.

* * * * *